United States Patent [19]

Sagami

[11] Patent Number: 4,717,519
[45] Date of Patent: Jan. 5, 1988

[54] METHOD FOR PRODUCING A STRING-SHAPED BACTERIA BED FOR SEWAGE OR WASTEWATER TREATMENT

[76] Inventor: Koji Sagami, 696-47 Shikawatashi, Yotsukaido-shi, Chiba Prefecture, Japan

[21] Appl. No.: 24,773

[22] Filed: Mar. 11, 1987

[51] Int. Cl.⁴ .................. B29C 53/02; B29C 61/02; B29C 61/10
[52] U.S. Cl. .................. 264/103; 264/230; 264/280; 264/281; 264/339; 264/DIG. 71; 156/84; 156/85; 156/196; 210/615; 210/150
[58] Field of Search .................. 210/615, 150, 151; 156/84, 85, 196; 264/103, 230, 285, 324, 339, 342 RE, DIG. 71, 281

[56] References Cited

U.S. PATENT DOCUMENTS

| | | | |
|---|---|---|---|
| 2,627,644 | 2/1953 | Foster | 156/84 |
| 2,703,774 | 3/1955 | Morrison | 156/84 |
| 2,977,664 | 4/1961 | Grajeck | 156/84 |
| 3,416,991 | 12/1968 | Yoshimura | 156/84 |
| 3,616,152 | 10/1971 | Chandler | 264/230 |
| 3,959,051 | 5/1976 | Schirmer | 264/230 |
| 4,102,456 | 7/1978 | Morris | 156/84 |
| 4,411,780 | 10/1983 | Suzuki | 210/220 |

FOREIGN PATENT DOCUMENTS

| | | | |
|---|---|---|---|
| 49-134965 | 12/1974 | Japan | 210/150 |
| 59-225793 | 12/1984 | Japan | 210/615 |
| 60-172398 | 9/1985 | Japan | 210/615 |

OTHER PUBLICATIONS

U.S. Patent & Trademark Office translation of Japanese Kokai Patent No. Sho 49[1974]-134965, Jun. 1987 PTO-4642.

*Primary Examiner*—Ernest G. Therkorn
*Attorney, Agent, or Firm*—Martin A. Farber

[57] ABSTRACT

A method for producing a string-shaped bacteria bed having many loops of fiber on the whole surface thereof, which is used for sewage or wastewater treatment, characterized by preparing a narrow strip of cloth made from a thermoplastic material, having many loops of fiber on the obverse thereof, and heating the reverse thereof having no loops of fiber by contacting it with a heating rod while tensing and drawing it diagonally, thereby the strip of cloth is diagonally curled and stranded by heat to form a string having many loops of fiber on the whole surface thereof. In such a method, the string, having high holding capacity of bacteria colony, is obtained by simplified installation.

5 Claims, 3 Drawing Figures

METHOD FOR PRODUCING A STRING-SHAPED BACTERIA BED FOR SEWAGE OR WASTEWATER TREATMENT

BACKGROUND OF THE INVENTION

1. Field of the Invention

The present invention relates to a method for producing a string-shaped bacteria bed used for sewage or wastewater treatment, and more particularly, to a method for producing a string-shaped bacteria bed having high holding capacity of bacteria colony with very simplified installations.

2. Description of the Prior Art

The string-shaped bacteria bed is formed with many loops of fiber for holding bacteria colony therein on the whole surface thereof, and is used for sewage or wastewater treatment in the aeration tank by forming a module consisting of prefabricated curtain arrangement supported in said tank by light weight beams at the top and the bottom of the curtain.

This type of bacteria bed is very useful in practice as follows.

(1) The string-shaped bacteria beds (elements) are arranged to form a curtain by spacing the same, and consequently the element volume can be changed easily.

(2) Since the elements are installed in the tank by means of a hanging frame, installation is very easy.

(3) The elements can be folded for shipment, thus reducing packing dimensions and transportation costs.

There are conventionally known method for producing a string-shaped bacteria bed, such as a method comprising steps of preparing a narrow strip of cloth having many loops of fiber on the obverse thereof, and stretching and twisting the the strip by a stretching and twisting machine to form a twisted or stranded mole-like string having many loops of fiber on the whole surface thereof. (Japanese laid-open patent publication No. 134965/74).

With such conventional method, however, various disadvantages are encountered: the twist or strand of the string gradually loosens even though the twisting is adequate, and consequently the holding capacity of bacteria colony in the string becomes lower, and moreover, the stretching and twisting machine is required for twisting, and thus the installations therefor become complicated.

SUMMARY OF THE INVENTION

It is an object of the present invention to provide a method for producing a string-shaped bacteria bed for sewage or wastewater treatment wherein the disadvantages found in the prior are overcome.

It is another object of the present invention to provide such a method wherein a string-shaped bacteria bed, having high holding capacity of bacteria colony, is obtained.

It is furthermore another object of the present invention to provide such a method wherein the installations therefor are simplified.

According to the present invention, the above objects are accomplished by providing a method for producing a string-shaped bacteria bed having many loops of fiber on the whole surface thereof, which is used for sewage or wastewater treatment, characterized by preparing a narrow strip of cloth made from a thermoplastic material, having many loops of fiber on the obverse thereof, and heating the reverse thereof having no loops of fiber by contacting it with a heating rod while tensing and drawing it diagonally, thereby the strip of cloth is diagonally curled and stranded by heat to form a string having many loops of fiber on the whole surface thereof.

DETAILED DESCRIPTION

The present invention is illustrated in detail with the attached drawings.

Figure 1:
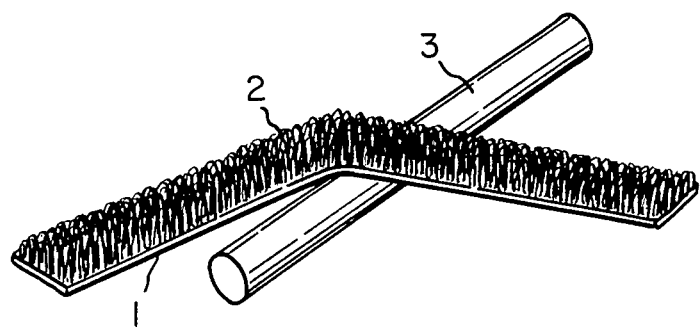
FIG. 1 shows an oblique view for illustrating a method of the present invention.

In FIG. 1 the numeral 1 indicates a strip of cloth having many loops 2 on the obverse thereof, and the strip 1 is prepared by knitting thermoplastic fibers, such as polyvinylidene chloride fibers with a suitable width and length, for instance, a width of about 5 mm and endless length, while pulling the fibers on the obverse thereof to form loops 2 with a conventional process, such as, pile weave. Of course, the loops may be embedded on the obverse thereof with other fibers.

The strip 1 thus obtained is then heated on the reverse thereof having no loops of fiber by contacting it with a heating rod 3 at a temperature of 300° to 350° C. while tensing and drawing it diagonally at a drawing speed of 8 to 10 m/sec., and at an angle of 30° to 60°, preferably at 45° to the longitudinal direction of heating rod 3.

Figure 2:
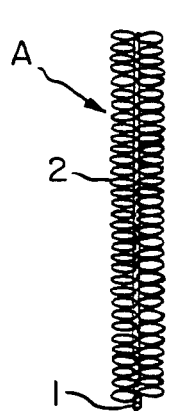
FIG. 2 shows a front view of the string-shaped bacteria bed obtained by the present invention and FIG. 3 is a cross sectional view of the string-shaped bacteria bed shown in FIG. 2.

The strip 1 of cloth thus heated is diagonally curled and stranded by heat to form a string A shown in FIG. 2, since the strip 1 is made from thermoplastic material which is easily curled and stranded by heat, and diagonal heating of the reverse easily leads to form a string A.

Figure 3:
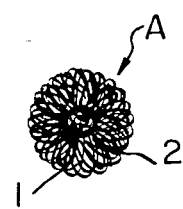

The cross sectional view of the string A thus obtained is a round shape shown in FIG. 3.

The obtained string A has many loops 2 of fiber on the whole surface thereof, and the strand thereof does not loose due to the diagonal heating, and thus, the holding capacity of bacteria colony thereof becomes high, and larger bacteria colony is kept in the loops.

Moreover, the string A is formed by using only heating rod 3 without the stretching and twisting machine shown in the prior art, and thus, the installation therefor becomes simplified.

EXAMPLE

The example was carried out in accordance with the attached drawings.

The strip 1 of cloth in FIG. 1 was prepared by knitting polyvinylidene chloride fibers with a width of 5 mm and endless length, while pulling the fibers on the obverse thereof to form loops 2 with the conventional pile weave.

The strip 1 was then heated on the reverse thereof by contacting it with a heating rod 3 at a temperature of 350° C. while tensing and drawing it diagonally at a drawing speed of 10 m/sec, and at an angle of 45° to the longitudinal direction of heating rod 3.

The strip 1 was diagonally curled and stranded by heat to form string A shown in FIG. 2 by a very simplified step. The cross sectional view of string A thus obtained was a round shape shown in FIG. 3. The obtained string A had many loops 2 of fiber on the whole surface thereof, and the strand thereof did not loose.

The string A was cut to a desired length, and the cut stings A were used sewage treatment in an aeration tank by forming a module consisting of prefabricated curtain arrangement supported in said tank by light weight beams at the top and bottom of the curtain. The holding capacity of bacteria colony of the loops 2 was high, and larger bacteria colony was kept in the loops 2. The efficiency of the treatment was high.

What is claimed is:

1. A method for producing a string-shaped bacteria bed having many loops of fiber on the whole surface thereof, which is used for sewage or wastewater treatment, comprising preparing a narrow strip of cloth made from a thermoplastic material, having many loops of fiber on the obverse thereof, and heating the reverse thereof having no loops of fiber by contacting it with a heating rod while tensing and drawing it diagonally, thereby the strip of cloth is diagonally curled and stranded by heat to form a string having many loops of fiber on the whole surface thereof.

2. A method for producing a string-shaped bacteria bed according to claim 1, wherein the heating rod is kept at a temperature of 300° to 350° C.

3. A method for producing a string-shaped bacteria bed according to claim 1, wherein the drawing speed is kept at 8 to 10 m/sec..

4. A method for producing a string-shaped bacteria bed according to claim 1, wherein the drawing angle is kept at an angle of 30° to 60° to the longitudinal direction of said heating rod.

5. A method for producing a string-shaped bacteria bed according to claim 1, wherein the cross sectional view of the string is a round shape.

* * * * *